United States Patent [19]
Robison

[11] Patent Number: 5,518,053
[45] Date of Patent: May 21, 1996

[54] WORK SUPPORT FOR POWER TOOLS

[75] Inventor: James N. Robison, 905 Sherwood Ave., Waynesboro, Va. 22980

[73] Assignees: James N. Robison; Rebecca S. Lista, both of Waynesboro, Va.; a part interest

[21] Appl. No.: 261,503

[22] Filed: Jun. 16, 1994

[51] Int. Cl.$^6$ ................................................ B25H 1/00
[52] U.S. Cl. .................. 144/286.1; 83/574; 83/471.3; 144/287; 144/286.5; 144/1.1
[58] Field of Search ............................ 144/1 R, 286 R, 144/286 A, 287; 83/574, 471.3

[56] References Cited

U.S. PATENT DOCUMENTS

| | | | |
|---|---|---|---|
| 3,342,226 | 9/1967 | Marcoux et al. | |
| 3,734,151 | 5/1973 | Skirpsky | 144/286 R |
| 4,068,551 | 1/1978 | Kreitz | 83/471.3 |
| 4,328,846 | 5/1986 | Hanson | 144/287 |
| 4,640,326 | 2/1987 | Hewitt | 144/287 |
| 4,693,158 | 9/1987 | Price | 144/287 |
| 4,798,113 | 1/1989 | Viazanko | 83/471.3 |
| 4,852,623 | 8/1989 | Rodigues | 144/287 |
| 4,874,025 | 10/1989 | Cleveland | 144/287 |
| 4,974,651 | 12/1990 | Carmon et al. | 144/287 |
| 5,004,029 | 4/1991 | Garner | 144/287 |
| 5,082,037 | 1/1992 | Hammons et al. | 144/286 R |
| 5,105,862 | 4/1992 | Skinner | 83/471.3 |
| 5,161,590 | 11/1992 | Otto | 144/186 R |
| 5,165,317 | 11/1992 | Findlay | 83/574 |
| 5,320,150 | 6/1994 | Everts et al. | 144/287 |
| 5,329,979 | 7/1994 | Miller et al. | 144/286 R |

OTHER PUBLICATIONS

*The Remodling News*, Aug. 1990; Rousseau Miter Saw H. D. Stand—H. D. 2900 brochure—2 pages; Rousseau Co., 1712 13th Street, Clarkston, WA 99403.

Trend.lines Catalogue No. 508 H&I, pp. 2, 31, and 33 as identified in Information Disclosure Statement; Trend.lines Worker's Warehouse, 375 Beacham St., Chelsea, MA 02150; p. 2.

Trend.lines Catalogue No. 510A, Jan. 19, 1994, Trend.lines Worker's Warehouse, 375 Beacham St., Chelsea, MA 02150.

Trend.lines Catalogue, not dated; Trend.lines Worker's Warehouse, 375 Beacham St., Chelsea, MA. 02150; (selected apparatus identified in information Disclosure Statement).

*Primary Examiner*—W. Donald Bray
*Attorney, Agent, or Firm*—Henderson & Sturm

[57] ABSTRACT

The present invention is directed to a work support composed of a work surface mounted on a frame adapted to support a piece of work; and at least one laterally adjustable support cooperatively associated with the work surface, the at least one adjustable support including: a support surface; at least one telescoping structure having a plurality of telescoping sections, wherein one of the telescoping sections has an end attached to the frame and another of the telescoping sections has an end in communication with the support surface.

18 Claims, 6 Drawing Sheets

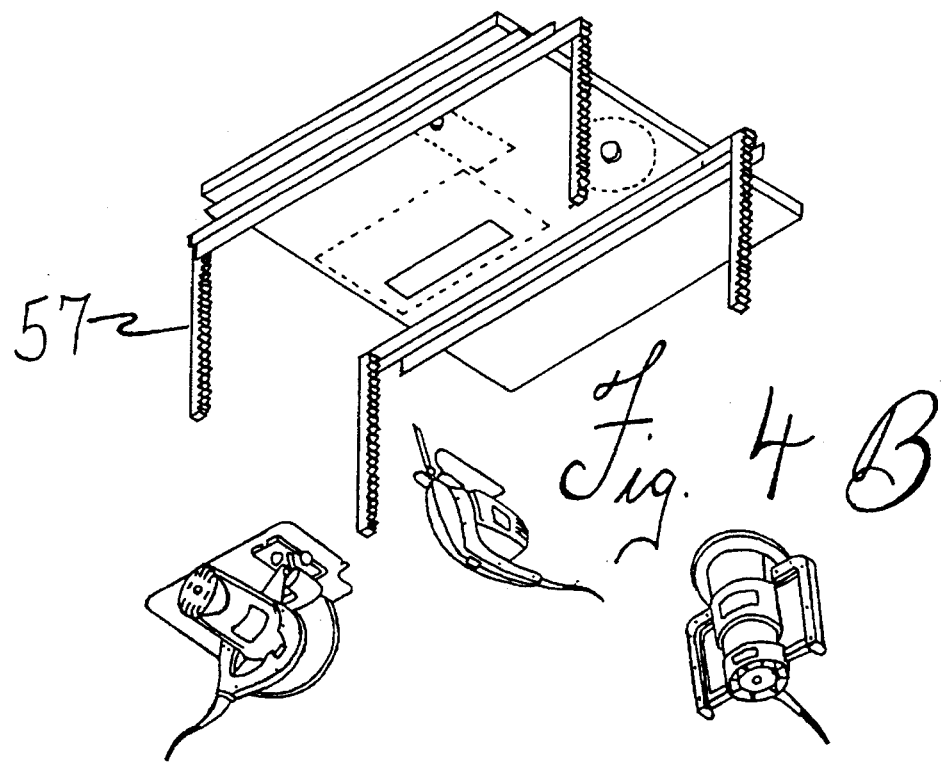
Fig. 4B
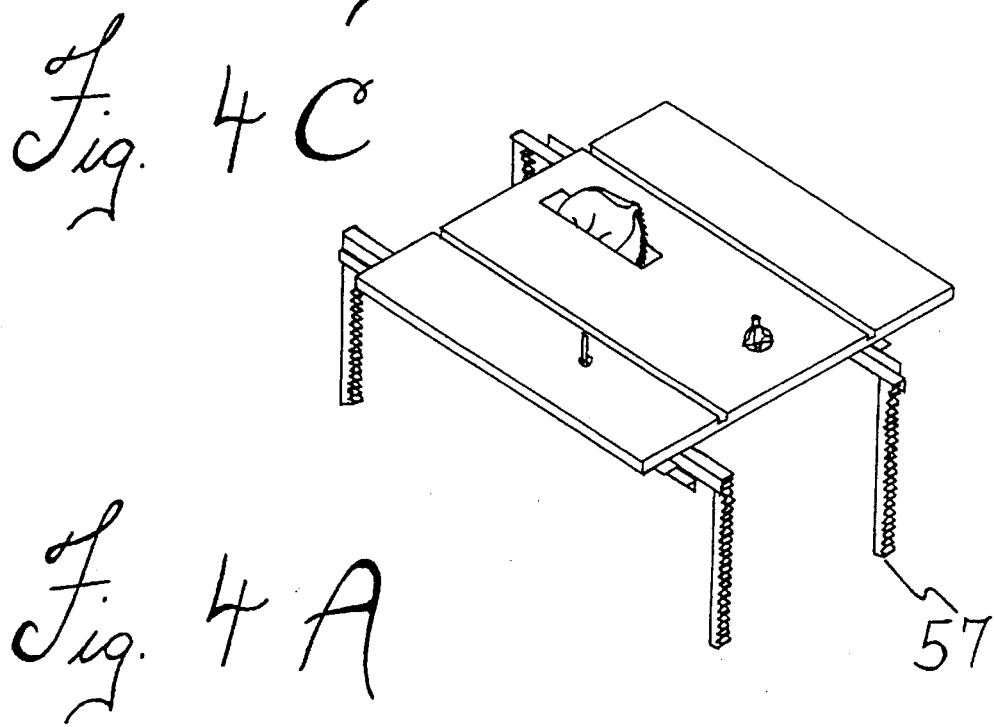
Fig. 4C
Fig. 4A

WORK SUPPORT FOR POWER TOOLS

TECHNICAL FIELD

This present invention relates to supports for work and/or power tools.

DISCUSSION OF BACKGROUND

Work support tables and supports for power tools are known.

However, prior to the present invention, supports for work and/or power tools having the features, functions and other capabilities, as described herein, were not known.

Many factors influence the acceptance of a product in the market place. Two of the major factors relate to the needs a product fulfills, i.e., the benefits of the product and a desire to own that product the, i.e., the appeal of the product, and/or a combination of these factors. Also important are the trends and outlook of the industry pertaining to the invention.

Power miter saws have become a boon to professional contractors, such as carpenters and cabinet makers. Their small size enables them to be easily transported to almost any job site, while their powerful cutting action speeds through cuts that would have taken hours with old-fashioned hand saws. One drawback with these saws, however, is the small table with which most of them are equipped as most projects require the cutting of a section of wood longer than one (1) foot. Therefore, some type of assistance or support must be used to hold the workpiece in the appropriate position. This usually comes in the form of a helper physically holding the work or board in place or a jury-rigged support stand. The latter, in addition to consuming a significant amount of labor to fabricate, is also usually unstable leading to inaccuracies. It can also be dangerous, since many jury-rigged stands are often fairly bulky. Also, single piece devices are difficult to carry and store.

In response to this problem, some power and woodworking tool manufacturers have begun to offer special folding support stands for power miter boxes. Although these have overcome some of the aforementioned problems associated with these types of saws, they still represent a compromise. For example, some "hand-truck" style units provide no method of supporting long workpieces, while some longer versions are not portable. Others are limited to the range of different sizes and types of power miter saws they can accommodate.

SUMMARY OF THE INVENTION

The work support of the present invention is directed to a new type of work station for power tools, such as miter boxes, that would overcome these disadvantage and limitations and provide a much greater level of flexibility and versatility.

The work support of the present invention is preferably portable, and most preferably employs a "hand truck" configuration. This feature, combined with its lightweight aluminum construction makes it extremely easy to move around at a job site and loaded and unloaded from the bed of a work vehicle.

The work support of the present invention offers a much greater cutting capacity than other stands, particularly when its extension, roller, stop system assemblies are deployed. These features of the present invention essentially eliminate the need of an assistant to have to support the free end of long work pieces and help improve the accuracy at which they are cut.

From a versatility standpoint, the work support of the present invention, which may also be referred to as a stand or table, features quick release lever handles, and hand wheel working in conjunction with a series of shafts, bearings, spur gears, gear racks, sprockets, and a drive chain for the precision adjustment of table height.

The work support of the present invention also features built-in height scales. These features of the work support of the present invention enable the user to switch between a wide range of different size power miter boxes, abrasive cut-off saws and the like in a matter of minutes without any tools.

In addition to enhancing productivity, the work support of the present invention lends itself to a wide range of materials, including lumber, vinyl and metal siding, copper, plastic, and steel pipe, and the like, thereby appealing to a wide range of different tradesmen.

Relating to its use by carpenters and other tradesmen who must frequently cut lumber and other materials, the work support of the present invention offers the convenience of a fully adjustable rip fence and left hand/right hand stop system, and extension roller supports. These features enable the work support of the present invention to be set up by an individual to quickly cut a series of long and/or short work pieces to the same length.

The work support of the present invention may be provided with structure, such as appropriate mounting holes and fixtures, to permit a circular saw, router, and a sabor saw to be mounted to the underside of the table in an inverted position, thereby enabling it to be converted into a precision table saw, router table, and/or scroll saw. Thus, the work support of the present invention may be used for making long rip cuts and producing chamfered and other types of decorative edges on a wide range of different trim work.

In addition to minimizing its weight, the aluminum construction of the work support of the present invention makes it resistant to corrosion. This feature, combined with its rugged fasteners, rollers, and other components makes it extremely durable and capable of withstanding years of daily commercial use.

The previously mentioned features of the work support of the present invention alone and/or in combination enable the work support of the present invention to improve the overall level of efficiency and productivity of its users.

The work support of the present invention fulfills the need for an improved method of making cuts in lumber, pipe, siding and other construction materials. Some of the appealing features of the work support of the present invention is its versatility, large capacity, small size when it is in storage, convenience and the improved quality of work the work support of the present invention permits.

The work support of the present invention normally stands at a comfortable predetermined height, preferably of about 32 inches, and is adjustable up to a predetermined adjusted height, preferably of about 36 inches, and allows the user to work without the need of an assistant to help hold and/or support long workpieces.

The work support of the present invention is particularly suited for being transported and/or stored. For example the work support of the present invention may be modified a small enough package to easily be hand-trucked or carried, and/or is capable of fitting into the limited confines of a carpenters work vehicle. The work support of the present invention may also be disassembled into a storage mode.

Through the work support of the present invention conversion process it eliminates the necessity of hauling other large and not so portable pieces of power equipment from one job site to another.

Once all the different tools, such as the previously mentioned power tools, have been mounted to the work support of the present invention, they may be left permanently in place if so desired as one will not interfere with the function of the other.

The work support of the present invention easily achieves all its desired goals because as it is largely geared toward professional, residential, and industrial framing and trim carpentry.

The heavy duty design feature of the work support of the present invention makes it extremely durable, delivering years and years of dependable service to the user.

The work support of the present invention is particularly suitable for use in conjunction with power tools, such as power miter boxes and abrasive cutoff saws. The work support of the present invention also permits the modification or conversion of common circular saws into a table saw, sabor saws into a scroll saw, and will also serve as a router table.

BRIEF DESCRIPTION OF DRAWINGS

The attached drawings depict selected views of the work support of the present invention.

FIG. 4A, FIG. 4B, and FIG. 4C show top and bottom perspective views, respectively, of the adjustable work surface of the apparatus of the present invention, and selected tools for attachment therewith.

Detailed Description

Figure 1:
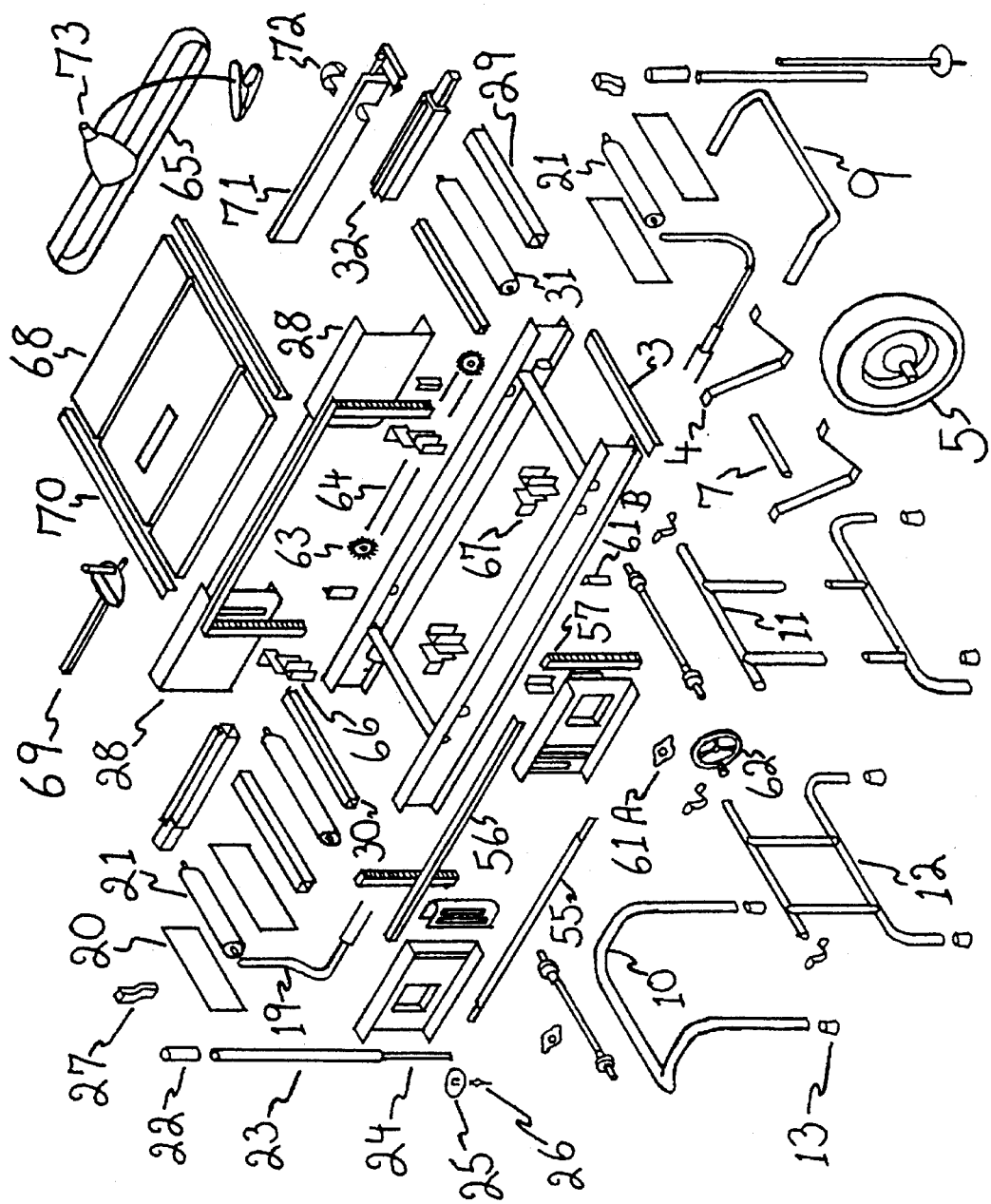
FIG. 1 is an exploded view of the work support of the present invention.
Figure 2:
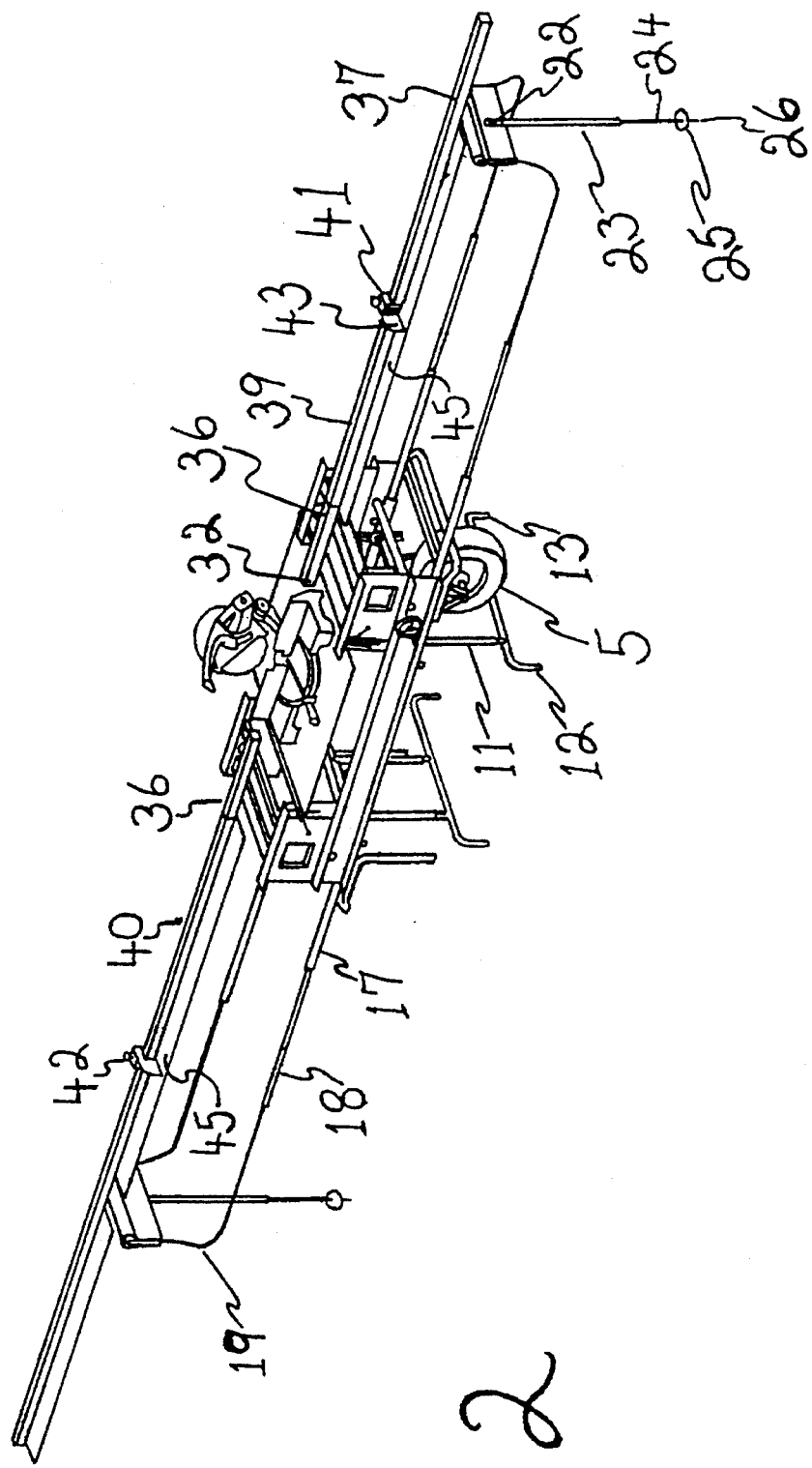
FIG. 2 is an isometric view of the work support of the present invention, an exploded view of which is illustrated in FIG. 1, with the laterally adjustable supports substantially fully extended, and showing the stop system of the present invention.
Figure 3:
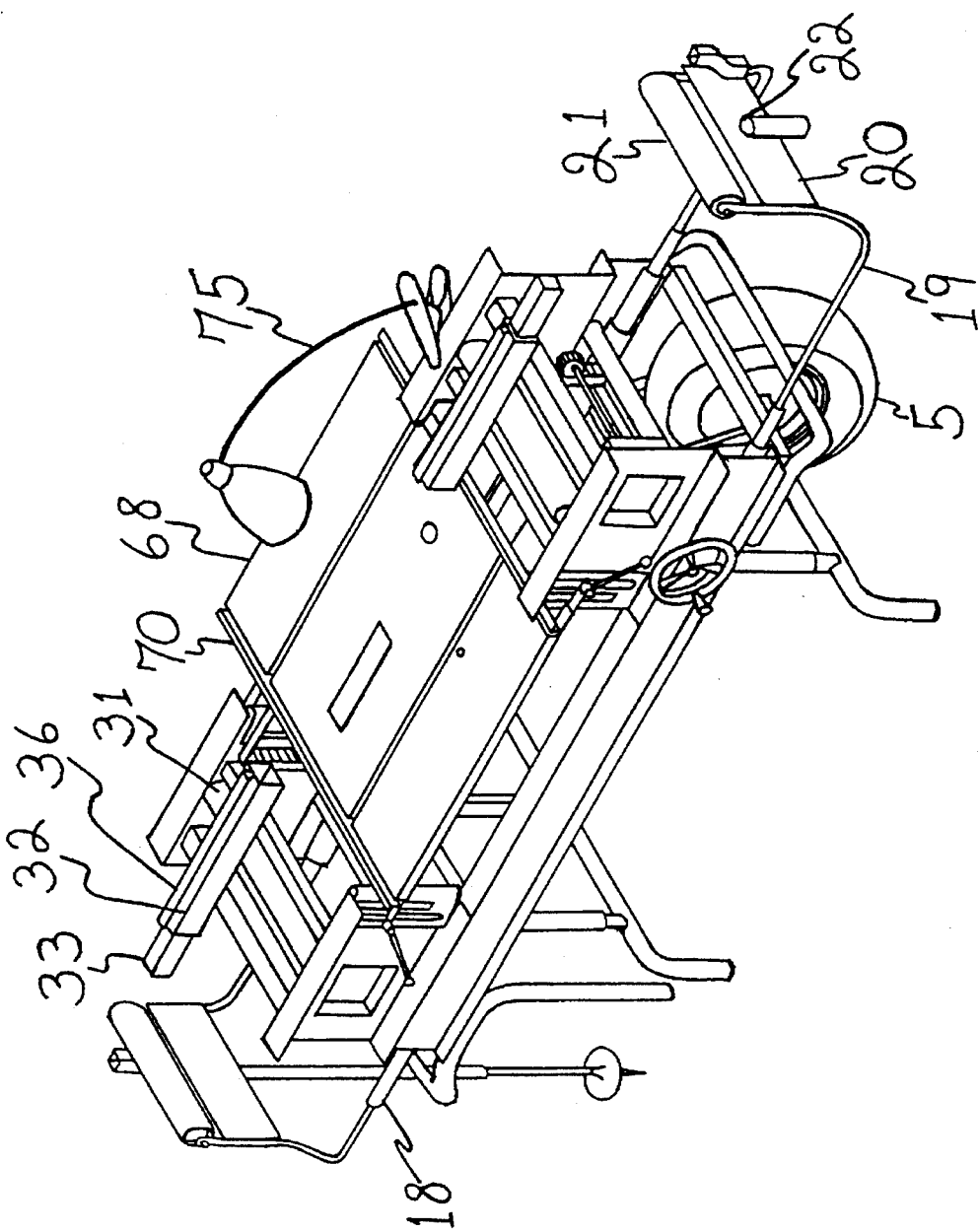
FIG. 3 is an isometric view of the work support of the present invention, an exploded view of which is illustrated in FIG. 1, with the laterally adjustable supports in a retracted position.
Figure 5A:
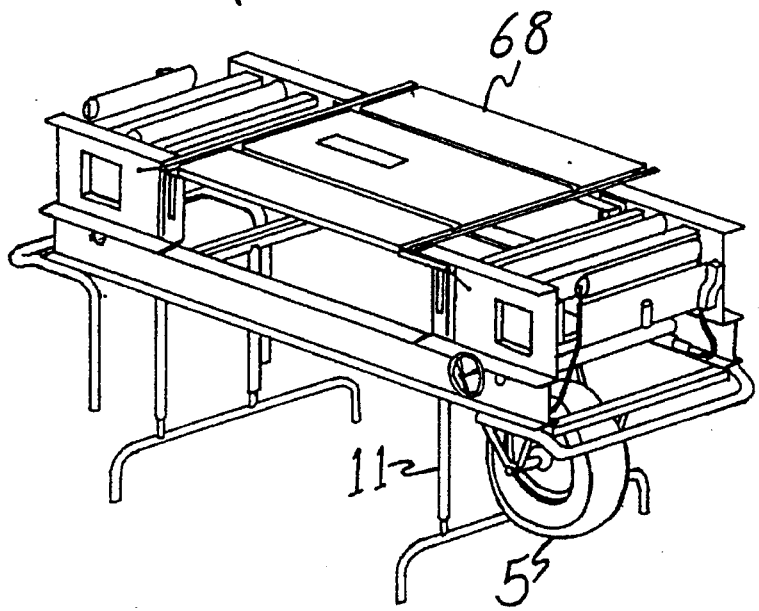
FIG. 5A and FIG. 5B show perspective views of the work support of the present invention, the latter showing the supplemental work support surface with a rip fence cooperatively associated with the work support surface.
Figure 5B:
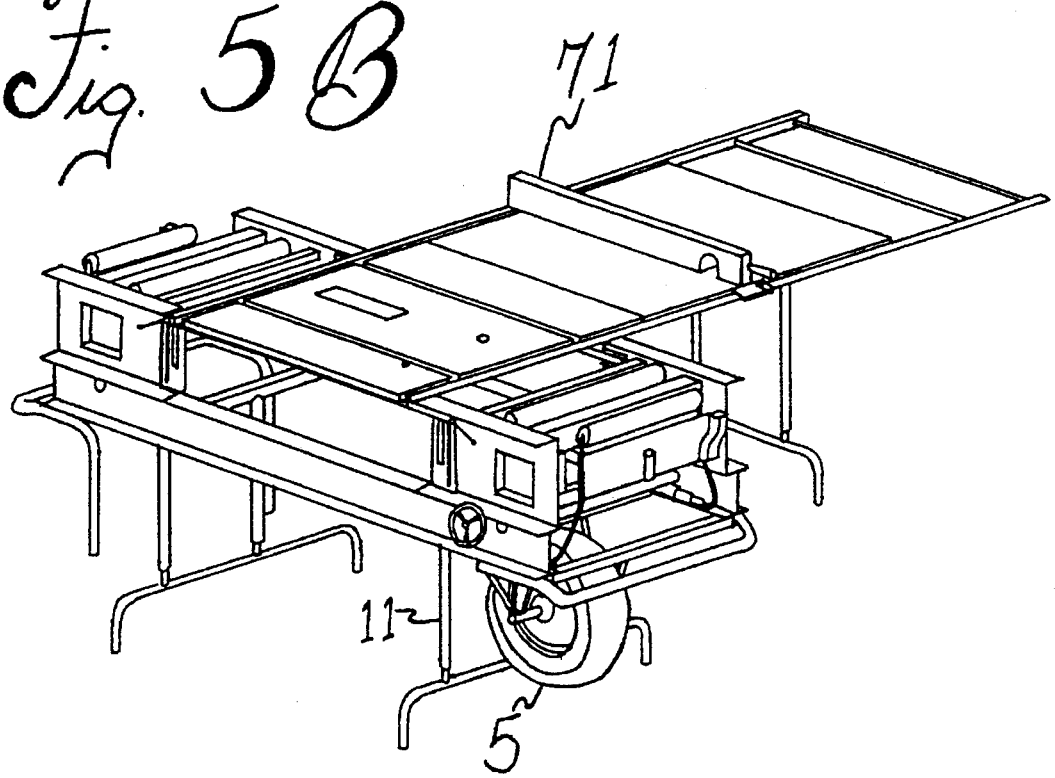
Figure 6:
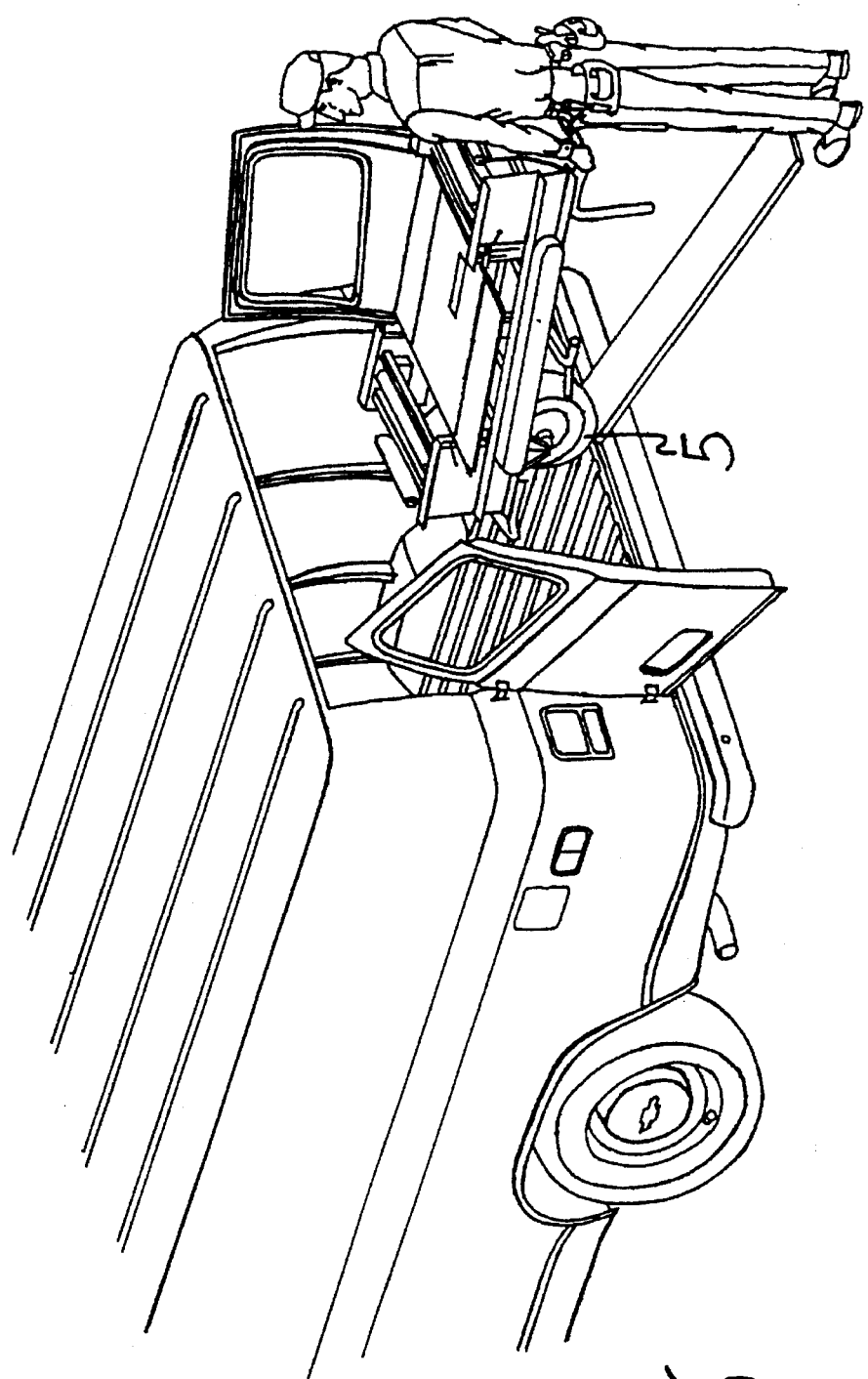
FIG. 6 illustrates the apparatus of the present invention as a portable structure wherein the most preferred hand-truck structure or configuration is shown.

The following is a detailed description of the present invention that is intended to be claimed.

The present invention is directed to a work support apparatus that includes a work surface mounted on a frame, preferably in an adjustable manner such that the position of the work surface is adjustable relative to the frame, wherein the frame is adapted to support a piece of work; and at least one auxiliary support operatively associated with the work surface.

In accordance with the present invention, as previously described, the work support apparatus, includes a position adjusting structure for adjusting the position of the work surface relative to the frame wherein the work surface is mounted on the position adjusting structure, and wherein the position adjusting structure is operably associated with the frame, and preferably wherein the position adjusting structure comprises a gear-driven position adjustment device operably associated with the frame.

In accordance with the present invention, as previously described, the at least one auxiliary support comprises at least one member selected from the group consisting of a work surface extension device and at least one laterally adjustable support.

For purposes of the present invention, the at least one laterally adjustable support is attached to the frame and includes a support surface, and at least one telescoping structure having a plurality of telescoping sections, wherein one of the telescoping sections comprises an end attached to the frame and another of the telescoping sections comprises an end in communication with the support surface.

For purposes of the present invention, the auxiliary support comprises a work surface extension device comprising a work surface extension fitted to the work surface, wherein said work surface extension comprises an adjustable work surface extension support stand for supporting the work surface.

In accordance with the present invention, as previously described, the support surface preferably comprises a bearing roller, and the at least one laterally adjustable support further comprises a bearing roller support on which the bearing roller is rotatably mounted. Preferably, the at least one laterally adjustable support further comprises a support stand having one end removeably attached to the bearing roller support, and another end adapted to be placed on a floor surface, thereby supporting the bearing roller support.

In accordance with the present invention, as previously described, the end of another of the telescoping sections in communication with the support surface is attached to the bearing roller support, preferably wherein the support stand is adjustable in height relative to the floor surface.

Preferably, the work support is portable, and most preferably the portable work support comprises a hand-truck structure, wherein a wheel is attached to the frame for ease of movement.

The present invention, as otherwise described above, also includes a stop system operably associated with the at least one laterally adjustable support.

For purposes of the present invention, the stop system operably associated with the at least one laterally adjustable support comprises at least one section comprising a stop system work support, a stop system work support frame attached to said stop system support, and a stop assembly adjustably mounted to move along the stop system work support frame, preferably wherein the at least one section of the stop support system is supported by the at least one laterally adjustable support, preferably wherein the at least one section comprises at least another section which is supported by the frame, and most preferably wherein the at least another section is attached to the frame. The stop assembly preferably comprises a stop mounted to a block adapted to slide along a rail attached to the stop system work support frame. Preferably, the stop is pivotally mounted to the block so as to pivot away from the stop system work support.

The present invention as otherwise described above, also includes an adjustable rip fence operably associated with the work surface.

For purposes of the present invention, as otherwise described above, the at least one telescoping structure comprises two telescoping structures.

For purposes of the present invention, as otherwise described above, the at least one laterally adjustable support comprises two laterally adjustable supports.

In accordance with the previously described invention, the work surface comprises structure for mounting at least one tool to a side of the work surface; which may be the top side or the bottom side, or both sides, and preferably further comprises at least one tool mounted to the top and/or the bottom sides of the work surface. Where the tool is a portable bench-top tool, such as tools selected from the group consisting of a scroll saw, a planar, a grinder, a drill press and a miter or chop saw, the bench-top tools are preferably mounted to the top side of the work surface. Where the tools are selected from the group of portable hand tools selected from the group consisting of router skill saw, and sabor saw, the hand tools are mounted to the bottom side thus converting them from a circular saw to a table saw; from a sabor saw to a scroll saw; a router table.

The present invention is also directed to a work support apparatus comprising a stop wherein the work support apparatus includes at least one section which comprises a stop system work support, a stop system work support frame attached to said stop system support, and a stop assembly adjustably mounted to move along the stop system support frame.

For purposes of the present invention, as described above, the stop assembly preferably comprises a stop mounted to a block adapted to slide along a rail attached to the stop system work support frame. Preferably, the stop is pivotally mounted to the block so as to pivot away from the stop system work support.

The work support of the present invention will now be described in more detail in reference to the drawings.

Related to this the following legend is provided as a list of components of the work support of the present invention, and their reference numerals as used in the drawings.

For purposes of the present invention, the stop system comprises at least one section comprising a stop system work support; a stop system work support frame attached to said stop system support; and a stop assembly adjustably mounted to move along said stop system work support frame, preferably wherein the at least one section of the stop support system is supported by the at least one laterally adjustable support, and wherein the at least one section comprises at least another section, wherein the said at least another section being is supported by the frame.

Main Frame 1–27
1. Main frame;
2. Tubular cross members;
3. Angle stock (wheel kit);
4. Triangular Brackets (wheel kit);
5. Standard wheel barrow style tire;
6. Standard wheel barrow style rim;
7. Axle;
8. Axle mounting brackets;
9. Right hand end handle;
10. Left hand end handle and leg section;
11. Folding leg assemblies (upper section);
12. Folding leg assemblies (lower section);
13. Rubber feet;
14. Pull pins;
15. Folding leg assembly mounting brackets;
16. Extension tube housings tubing;
17. Extension tube "A";
18. Extension tube "B";
19. Extension tube "C";
20. Extension cross members;
21. Bearing roller;
22. Extension leg housing;
23. Extension leg;
24. Extension leg;
25. Extension leg foot;
26. Foot spike;
27. Stop system support "B";

Upper Frame Members 28–36
28. Main (upper) frame members;
29. Upper cross members;
30. Upper cross members;
31. Bearing roller;
32. Right and left hand stop system support tubes; "A";
33. Tenon (for support tubes "A".);
34. Thumb screws;
35. Thumb screws;
36. Stop system rail section with bevel;

Right And Left Hand Stop Systems 37–46
37. Right hand stop system tube;
38. Left hand stop system tube;
39. Right hand stop system rail section with bevel;
40. Left hand stop system rail section with bevel;
41. Right hand stop block;
42. Left hand stop block;
43. Right hand stop blade;
44. Left hand stop blade;
45. Right and left hand stop systems work tables;
46. Left hand stop system work table;

Electrical 47–50
47. Duplex receptacle box;
48. Switch box;
49. Receptacle box;
50. Electrical pig-tail stranded copper wire with ground;
51. Right hand nosing sections;
52. Left hand nosing sections;
53. Lock down and/or quick release screws and lever style handles;
54. Nosing rollers
55. Outer most (main work table) framing angle;
56. Inner most (main work table) framing angle stock.

Gears Gear Racks, Sprockets 57–67
57. Gear racks;
58. Shaft "A". step turned and keyed (right hand);
59. Shaft "B", step turned and keyed (left hand);
60. Spur gears with bore;
61. A. Housed bearings with set screws;
62. Hand control wheel with knob with bore;
63. Sprockets with bore;
64. Drive chain with master link;
65. Chain guard;
66. "F" channel sections or gear rack back supports with open channel;
67. Gear rack back support mounting brackets angle stock with notch;

Main Work Table 68–74
- 68. Main work table;
- 69. Tee-bevel;
- 70. Rip fence rails;
- 71. Rip fence;
- 72. Cutter blade guard;
- 73. Clip-on style lamp 110 volt;
- 74. Main work table extension with leg assembly, rip fence rails and handle;

The work support of the present invention, as illustrated in the drawings, the components of which have been identified and/or described above in reference thereto, is composed of a ladder-style frame having a predetermined size that preferably measures about 4 feet in length by about 18¾ inches wide. The two main sides or lower (I-beam) frame members 1 preferably measuring about 2" wide by about 4" tall by about 4 feet long and are separated by two, preferably about 1½" in diameter by about 16½" in length, tubular cross members located preferably about 5½" from each end on center and slightly up. The underside of the main or lower (I-beam) frame members are separated by two pieces of, preferably about 1" by 1" by about 16½" in length, angle stock 3 on the right hand end and to which is mounted to two-triangular shaped brackets 4, preferably about 1½" by ⅛ by about 22" in length.

This assembly is used to mount a single wheel barrow style tire 5, and wheel 6. These are normally tubeless and have an approximate outside diameter of preferably about 16" mounted to the underside of the lower (I-beam) frame members 1.

Frame members are formed or bent tubular handles 9 at both right and left hand ends. The left end handle features downward curved temporary support legs extending, preferably about 13", with rubber feet 13, permitting a three point stance when the unit is in storage.

Mounted to the underside of the lower (I-beam) frame members 1 is a pair of adjustable folding legs 11, 12 with rubber feet 13 and spaced apart, preferably by about 27 inches. Leg assemblies are similar to those used on banquet tables. The upper leg members 11 are, preferably about 1¼" in diameter, tubing while the lower 12 members are preferably 1" diameter, tubing making the leg assembles adjust up and down with holes and pull-pins 14. The leg assemblies are locked in their standing position with stamped metal pivoting bracket assemblies. Mounted on the inside of the lower (I-beam) frame members 1 are at least one front and at least one rear tubes 16, preferably about 1½" in diameter by about 40" in length. Extending from these tubes is a series of smaller slidable or telescoping extension tubes 17 18, 19, featuring a bearing roller 21 preferably about 2" in diameter by about 10¼" in length at each end with height adjustable legs 22, 23, 24, 25, 26. Stop system support "B" 27 is also located in this assembly. The upper members 23 of these tubular extension support legs are preferably about 1" in diameter by about 20" tall, while the lower members 24 of leg assemblies are preferably about ¾ in diameter by about 20" tall making them adjust up and down with holes and pull-pins 14 and also featuring a thick swiveling foot plate 25 preferably about 4" in diameter by about ¼, wherein the foot plate has a durable rubber disc glued to its underside and features a removable, preferably about 1½" tall by about ¼"–20, threaded spike 26 making this foot plate 25 easily adaptable to rough ground, concrete, or other types of flooring.

Upper Frame Members and Associated Parts

Mounted at each end, to the upperside of the lower (I-beam) frame members 1 are four upper C-channel frame members 28 measuring, preferably about 2" wide by about 8" tall by about 12" in length. These upper C-channel frame members 28 are separated by four (square tubular) cross members. The two outside cross members 29 measures, preferably about 2" by 2" by about 14¾" in length. The two inside cross members 30 preferably measures about 1" by about 1" by about 14¾" in length, a single, preferably about 2" in diameter by about 14¼" in length, bearing type roller 31 is located between said cross members. Mounted on the upperside of the upper square tubular cross members 29, 30 are the right and left hand stop system support tubes "A" 32 measuring preferably about 2"×2" by about 12" in length. Inserted into stop system support tube "A" 32 is a solid, preferably about 1½" by about 1½" by about 14" in length, stationary tenon 33 extending out from right and left hand ends, thus creating a mortise and tenon type set-up for which the right and left hand stop systems may be easily and quickly installed or removed with holes and pull pins 14, 32. Stop system support tubes "A" are easily and quickly removed with thumb screws 34, 35 to prevent interference with the work support of the present invention table saw, scroll saw and router table functions.

Stop Systems and Associated Parts

The work support of the present invention measures preferably about 2" by about 2" by about 6 feet 3" in length, while the left hand stop system measures preferably about 2" by 2" by about 8 feet 3" in length. The right and left hand stop system tubes 37 feature a pressure sensitive tape with scale of measure on the face of the tubes. Mounted on the upper side of the stop 32 system support tubes "A" and also to the right and left hand stop system tubes 37, 38 (via type "A" screws) is the stop system rail sections 36, 39, 40. The stop system rails are forged steel measuring preferably about 1" wide on its upper side by about ⅜" thick, with a bevel, preferably about 25°, running by its length making its lower side measure preferably about ⁴³⁄₆₄ of an inch. The stop systems stop blocks 41, 42 are solid steel blocks measuring preferably about 2" by about 2" by about 1¼" thick and is grooved on its underside to allow it to easily and quickly slide back and forth on the stop system rail sections.

The user is able to quickly and easily lock the stop blocks in a desired location using a thumb screw. The stop blocks feature a pivoting stop blade 43 with adjustable clear plastic windows. The windows feature an embossed red center line allowing the user to adjust the stop system for accuracy regardless of the thickness of the saw blade being used because the right and left hand stop block assembly 41, 42 are substantially identical only opposite of each other. The user has preferably about an 8 ft. cutting capacity on the right hand stop system 37 and preferably about a 10 ft. cutting capacity on the left hand stop system 38. Mounted to the underside of both right and left hand stop system is a series of flat plate stock measuring preferably about 5" wide by about ¼ thick and spaced down preferably by about ¼. This serves as the stop systems work table thus cutting down on the amount of rollers necessary to support long work pieces. The stop system work table 45 on the right is preferably about 57" in length while the two on the left are preferably about 57" and preferably about 37" in length. The stop system of the present invention is particularly advantageous when working on relatively thin material having a thickness within the range of about ⅛" to about ³⁄₁₆".

Electrical and Associated Parts

The front upper right hand frame member 28 features a duplex receptacle 47 used to supply power to other areas of a given job site while the front upper left hand frame member 28 features switches 48 controlling a receptacle located and/or mounted to the inside center of the lower (I-beam) frame member. The receptacle is the power source for the circular saw, table saw, sabor saw, scroll saw and router table functions. The work support of the present invention features a short pig tail of a cord being used in conjunction with an appropriate length of extension cord plugged into a (110 volt) main power source.

Nosing Sections and Associated Parts

Mounted to the inner most end of each of the four upper frame members 28 is a section of wrap around nosing 51, 52, preferably about 2" wide by 7½" tall, attached with type "A" screws or pop-rivots. The face of said nosing 51, 52, preferably about 2" wide, features a pressure sensitive tape with sale of measure. It also has a vertical slot, preferably measuring about ⅜ wide by approximately 6½ tall, in which the lock down and/or quick release screws and their associated lever-style handles 53 operate. Riding up and down against the rounded face of each of the four nosing sections 51, 52 is a small roller 54 with a concaved face having the appropriate curvature matching the described nosing 51, 52. The nosing rollers 54 are preferably about 1" in diameter by about ⅝ thick. The roller 54 has a sleeve preferably measuring about ¹³⁄₁₆" wide by about ⅜" in diameter, with bore, preferably about ¼". The four nosing sections 51, 52 and their associated rollers 54 are sandwiched between the main work table, preferably made from framing angle stock measuring about 1" by about 1¼", the two outer most pieces 55 are preferably about 28" in length while the two inner most pieces 56 are about 31" in length, and are supported at each end by a gear rack.

Gears, Gear Racks, Sprockets and Associated Parts

Each of the four gear racks 57 preferably measure about 1" by 1" by about 10" tall. The entire main work table 68 assembly is raised or lowered with shafts 58, 59 and spur gear assemblies located in the lower (I-beam) frame members. The shafts 58, 59 are mounted with housed bearings with set screws. The right hand shaft 58 extends completely through both front and rear of the lower frame member. This shaft features 58 a control hand wheel 62, preferably measuring 5" in diameter, at the front while the rear features a sprocket 63 preferably measuring about 3" in diameter with the two spur gears 60 preferably measuring about 2" in diameter located inside the lower (I-beam) frame members. The left hand shaft 59 is mounted in the same manor but only extends completely through the rear lower frame member and features a sprocket 63, preferably measuring about 3" in diameter at the rear with its spur gears 60, preferably measuring about 2" in diameter, located inside the lower frame members. The right and left hand shaft assemblies are connected at the rear with a chain assembly 64 in conjunction with the sprockets 63, preferably measuring about 3" in diameter. Although a chain drive assembly is described herein, a shaft drive assembly for functioning in the same or a substantially similar manner may be used in accordance with the present invention. Mounted to the inside of the lower frame members are four pieces of "F" channel 66, preferably about 4" tall, and used as a back support for the lower portions of the four gear racks preventing the gear racks 57 from falling away from the four spur gears. The entire main work table framing assembly 68 and its associated parts are put together with nuts and bolts through slotted holes allowing the assembler to adjust all excess play out of this system thus giving the user precision movement when raising or lowering the main work table.

Main Work Table and Associated Parts

The work support of the present invention is mounted to the upperside of the work table framing 55, 56 (angle stock) with threaded bolts, preferably measuring about ¾" in length by about ¼–20. The table 68 preferably measures about 20¾" in length by about 24" wide by about 1" thick. This may be plate stock or cast. The table 68 features a slotted hole preferably measuring about 8¼" in length by about 1¾" in width. The second hole preferably measures about 1½" in diameter, and the third hole preferably measures about 1" in diameter. At these hole locations and from the underside, in an inverted position, a conventional power tool, such as a circular saw, sabor saw, and router may be mounted, thus converting these power tools into a table saw, scroll saw, and a router table, respectively. The main work table 68 features two grooves preferably measuring about a ½" wide, by about ¼ deep, by about 20¾ in length accommodating, a tee-bevel 69 which is used in conjunction with the table saw functions. The main work table features two pieces of angel stock 70, preferably measuring about ¾" by ¾" by about 24" in length. One of the sections of angel stock would feature a pressure sensitive tape with scale of measure and the angle stock serves as mounting fixtures for the slidable rip fence 71. The rip fence 71 is used in conjunction with the table saw and/or router table functions. The rip fence 71 preferably measures about 3" tall by about 1" thick, by about 21¾" in length with a locking handle located at one end and an associated clip at the opposite end being connected with, preferably about a ¼"–20, threaded rod. The rip fence 71 features an adjustable window with a contrasting color, such as red, embossed center line located at the handle end of the rip fence. The rip fence 71 features a substantially half moon-shaped plastic cup mounted in an inverted position serving as a cutter blade 72 guard being used in conjunction with the router table functions. The work support of the present invention features a (110 volt) clip 73 on style lamp.

A main work table extension preferably measures about 24" wide by about 20¾" in length and is preferably equipped with the necessary angle stock for the rip fence functions and an adjustable banquet style folding leg assembly with rubber feet and a suit case style carrying handle.

The work construction materials of the support of the present invention are preferably of extruded aluminum shapes and steel.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

What is claimed is:

1. A work support apparatus comprising:
   a) a work surface adjustably mounted in a position relative to a frame for supporting a piece of work;
   b) at least one auxiliary work support operably associated with said work surface; and
   c) a position adjusting structure for adjusting a position of said work surface relative to said frame, said work surface being mounted on said position adjusting structure.

2. The work support apparatus of claim 1, wherein said position adjusting structure is operably associated with said frame.

3. The work support apparatus of claim 2, wherein said position adjusting structure comprises a gear-driven position adjustment device operably associated with said frame for adjusting said position of said work surface vertically relative to a top side of said frame.

4. The work support apparatus of claim 1, wherein said at least one auxiliary work support comprises at least one laterally adjustable support attached to said frame, said at least one laterally adjustable support comprising:

i) a support surface; and ii) at least one telescoping structure having a plurality of telescoping sections, wherein one of said telescoping sections comprises an end attached to said frame and another of said telescoping sections comprises an end in communication with said support surface.

5. The work support apparatus of claim 4, wherein said at least one laterally adjustable support comprises:

iii) a bearing roller support on which a bearing roller is rotatably mounted.

6. The work support apparatus of claim 5, wherein said at least one laterally adjustable support comprises:

iv) at least one support stand having one end removeably attached to said bearing roller support, and another end for placement on a floor surface, thereby supporting said bearing roller support, wherein said end of said another of said telescoping sections in communication with said support surface is attached to said bearing roller support.

7. The work support apparatus of claim 6, wherein said at least one laterally adjustable support comprises two laterally adjustable supports, and wherein said two laterally adjustable supports are on opposite sides of said work surface.

8. The work support apparatus of claim 1, wherein said work support is a portable work support comprising a hand-truck structure comprising at least one wheel attached to said frame for moving said work support.

9. The work support apparatus of claim 1, comprising:

a stop system operably associated with said at least one laterally adjustable support.

10. The work support apparatus of claim 9, wherein said stop support system comprises at least one section, said at least one section comprising:

i) a stop system work support;

ii) a stop system work support frame attached to said stop system support; and iii) a stop assembly adjustably mounted to move along said stop system work support frame.

11. The work support apparatus of claim 10, wherein said at least one section of said stop support system is supported by said at least one laterally adjustable support.

12. The work support apparatus of claim 11, wherein said at least one section comprises at least another section, said at least another section being supported by said frame.

13. The work support apparatus of claim 12, wherein said at least another section is attached to said frame.

14. The work support apparatus of claim 1, comprising:

an adjustable rip fence operably associated with said work surface.

15. The work support apparatus of claim 1, wherein said work surface comprises structure for mounting at least one tool to a side of said work surface, said side of said work surface being selected from the group consisting of a top side and a bottom side.

16. The work support apparatus of claim 15, further comprising a tool mounted to said side of said work surface.

17. The work support apparatus of claim 1, wherein said at least one auxiliary work support comprises:

a work surface extension device comprising a work surface extension fitted to said work surface.

18. The work support apparatus of claim 17, wherein said work surface extension comprises an adjustable work surface extension support stand for supporting said work surface extension.

* * * * *